US012484741B2

(12) United States Patent
Ezell

(10) Patent No.: US 12,484,741 B2
(45) Date of Patent: Dec. 2, 2025

(54) HYGIENIC WAND FOR TOILETING APPLICATIONS

(71) Applicant: Delma Ezell, Riverdale, GA (US)

(72) Inventor: Delma Ezell, Riverdale, GA (US)

( * ) Notice: Subject to any disclaimer, the term of this patent is extended or adjusted under 35 U.S.C. 154(b) by 246 days.

(21) Appl. No.: 18/047,743

(22) Filed: Oct. 19, 2022

(65) Prior Publication Data

US 2023/0119299 A1 Apr. 20, 2023

Related U.S. Application Data

(60) Provisional application No. 63/257,328, filed on Oct. 19, 2021.

(51) Int. Cl.
*A47K 7/08* (2006.01)
*A61G 9/02* (2006.01)

(52) U.S. Cl.
CPC . *A47K 7/08* (2013.01); *A61G 9/02* (2013.01)

(58) Field of Classification Search
CPC .................................... A47K 7/08; A61G 9/02
See application file for complete search history.

(56) References Cited

U.S. PATENT DOCUMENTS

| | | | | |
|---|---|---|---|---|
| 4,031,673 A * | 6/1977 | Hagelberg | A47L 13/17 15/210.1 |
| 8,875,337 B2 * | 11/2014 | Tacoma | B65D 71/06 15/210.1 |
| 2005/0005378 A1 * | 1/2005 | Soller | A47K 11/10 15/210.1 |

* cited by examiner

*Primary Examiner* — Shay Karls

(57) ABSTRACT

An apparatus for toileting applications can include a handle having a grip end and an opposed clamp end that are spaced along a first axis. A clamp can be coupled to the clamp end of the handle. The clamp can have opposed gripping elements that are elongate along a longitudinal axis. The opposed gripping elements can be configured move toward and away from each other along a clamping axis. The opposed gripping elements can cooperate to define an application surface. The application surface can have a concavity in a direction away from the handle. An actuator can be configured to move the opposed gripping elements toward and away from each other.

19 Claims, 5 Drawing Sheets

HYGIENIC WAND FOR TOILETING APPLICATIONS

CROSS-REFERENCE TO RELATED APPLICATION

This application claims priority to, and the benefit of the filing date of, U.S. Provisional Patent Application No. 63/257,328, filed Oct. 19, 2021, the entirety of which is hereby incorporated by reference herein.

FIELD

This application is directed to apparatuses and methods for toileting applications.

BACKGROUND

Conventional toilet tissue aids are used by individuals having difficulty completing the wiping function (e.g., due to lack of mobility or obesity) or by caretakers who need to maintain physical spacing from intimate areas of a care receiver. Conventional toilet tissue aids have deficiencies that make usage difficult or insufficient for their intended purpose.

SUMMARY

Disclosed herein is an apparatus comprising a handle having a grip end and an opposed clamp end that are spaced along a first axis. A clamp can be coupled to the clamp end of the handle. The clamp can have opposed gripping elements that are elongate along a longitudinal axis. The opposed gripping elements can be configured for movement toward and away from each other along a clamping axis. The opposed gripping elements can cooperate to define an application surface. The application surface can have a concavity in a direction away from the handle. An actuator can be configured to move the opposed gripping elements toward and away from each other.

According to some aspects, bathroom tissue can be positioned between the opposed gripping elements of the clamp. The actuator can be actuated to grip the bathroom tissue with the opposed gripping elements. An individual can grip the grip end of the handle, and the bathroom tissue can be applied to a portion of a body of a person (e.g., the same individual gripping the grip end or another individual). The actuator can then be actuated to release the bathroom tissue.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Figure 1:
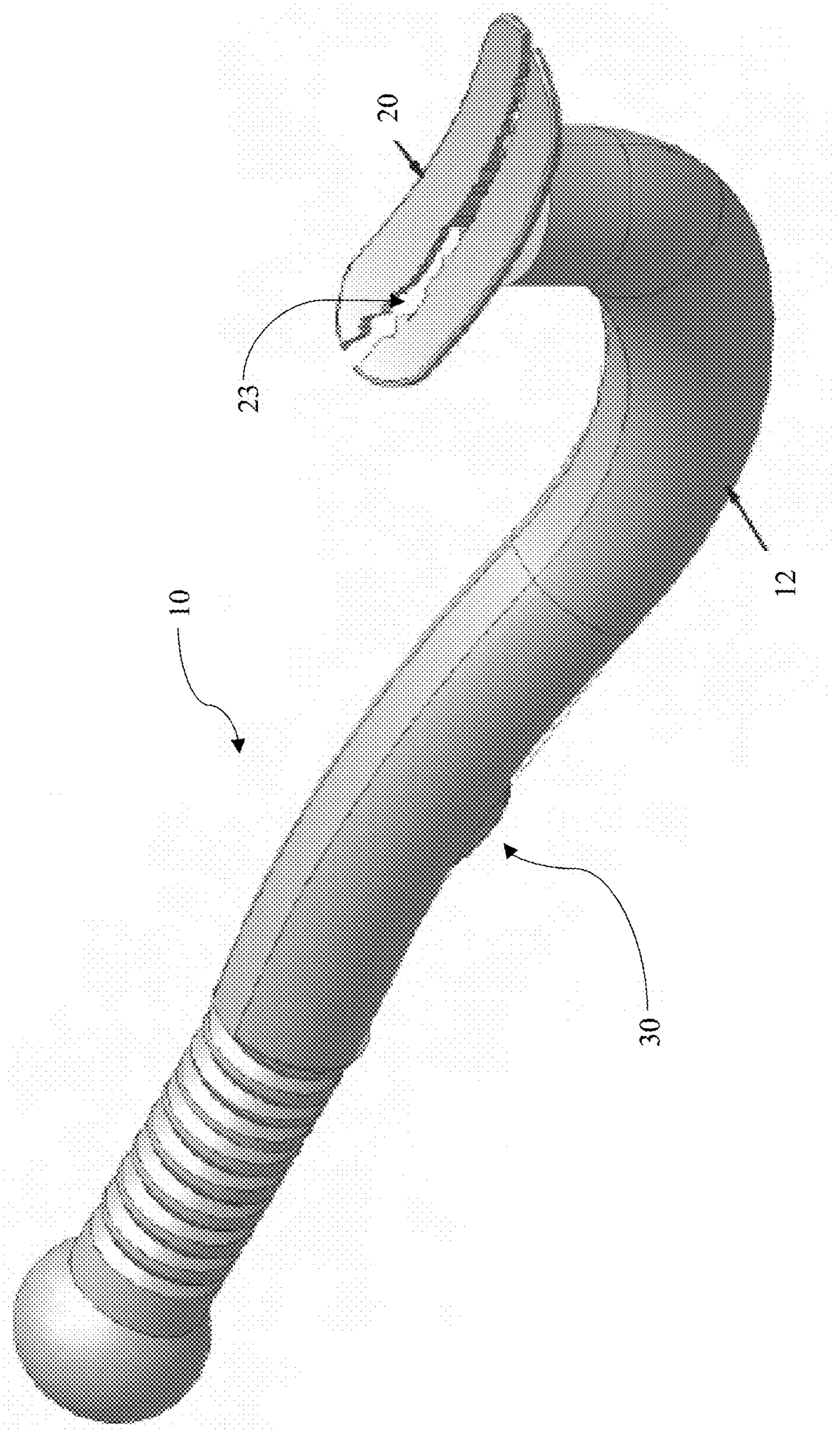
FIG. 1 is a perspective view of an apparatus as disclosed herein.

The present invention can be understood more readily by reference to the following detailed description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an," and "the" include plural referents unless the context clearly dictates otherwise. Thus, for example, reference to "a gripping element" can include two or more such gripping elements unless the context indicates otherwise.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects. Optionally, in some aspects, when references to elements being parallel to or perpendicular to are approximated by use of the antecedents "about," "substantially," or "generally," such as elements that are "substantially parallel to" or "substantially perpendicular to" each other, it is contemplated that said elements can be within 15 degrees of, within 10 degrees of, within 5 degrees of, or within 1 degree of parallel to or perpendicular to, respectively.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Referring to FIGS. 1-5, an apparatus 10 can comprise a handle 12 having a grip end 14 (e.g., a portion of the handle for gripping) and an opposed clamp end 16 (e.g., a portion of the handle opposite the grip end) that are spaced along a first axis 18. A clamp 20 can be coupled to the clamp end 16 of the handle 12. In some optional aspects, the clamp 20 can have opposed gripping elements 22 that are elongate along a longitudinal axis 24. The opposed gripping elements 22 can be configured for relative movement toward and away from each other along a clamping axis 26. For example, in some aspects, the opposed gripping elements 22 can both be movable toward and away from each other. In further aspects, one of the opposed gripping 22 elements can be fixed, and the other of the opposed gripping elements can be movable relative to the fixed gripping element along the gripping axis 26. In some aspects, the longitudinal axis 24 can be perpendicular to, or substantially perpendicular to, the clamping axis 26. The opposed gripping elements 22 can cooperate to define an application surface 28. Optionally, the application surface 28 can have a concavity in a direction away from (e.g., facing away from) the handle 12. An actuator 30 can be configured to move the opposed gripping elements 22 toward and away from each other. That is, the actuator 30 can effect movement of the opposed gripping elements 22 toward and away from each other. When moved away from each other, the opposed gripping elements 22 can define a receiving space 23 therebetween.

In some optional aspects, the actuator 30 can comprise a detent that is configured to retain the opposed gripping elements 22 in a gripping position in which the opposed gripping elements are positioned sufficiently closely to one another to retain paper therebetween. For example, in various optional aspects, in the gripping position, the opposed gripping elements 22 can be in contact with each other without paper therebetween, within 1 mm, within 2 mm, or within 3 mm.

Paper (e.g., toilet paper) or other wiping material (e.g., moistened wipes, a sponge, a washcloth, etc.) can be inserted between and retained by the opposed gripping elements 22. For example, the actuator 30 can be actuated to open the opposed gripping elements 22. The actuator 30 can then be actuated to draw the opposed gripping elements 22 toward each other along the clamping axis 26. A user can grip the handle 12 for applying the paper or other wiping material to a desired area. For example, the paper or other wiping material can be used for toileting applications. The actuator 30 can then be actuated to move the gripping elements 22 away from each other and release the paper or other wiping material.

Figure 2:
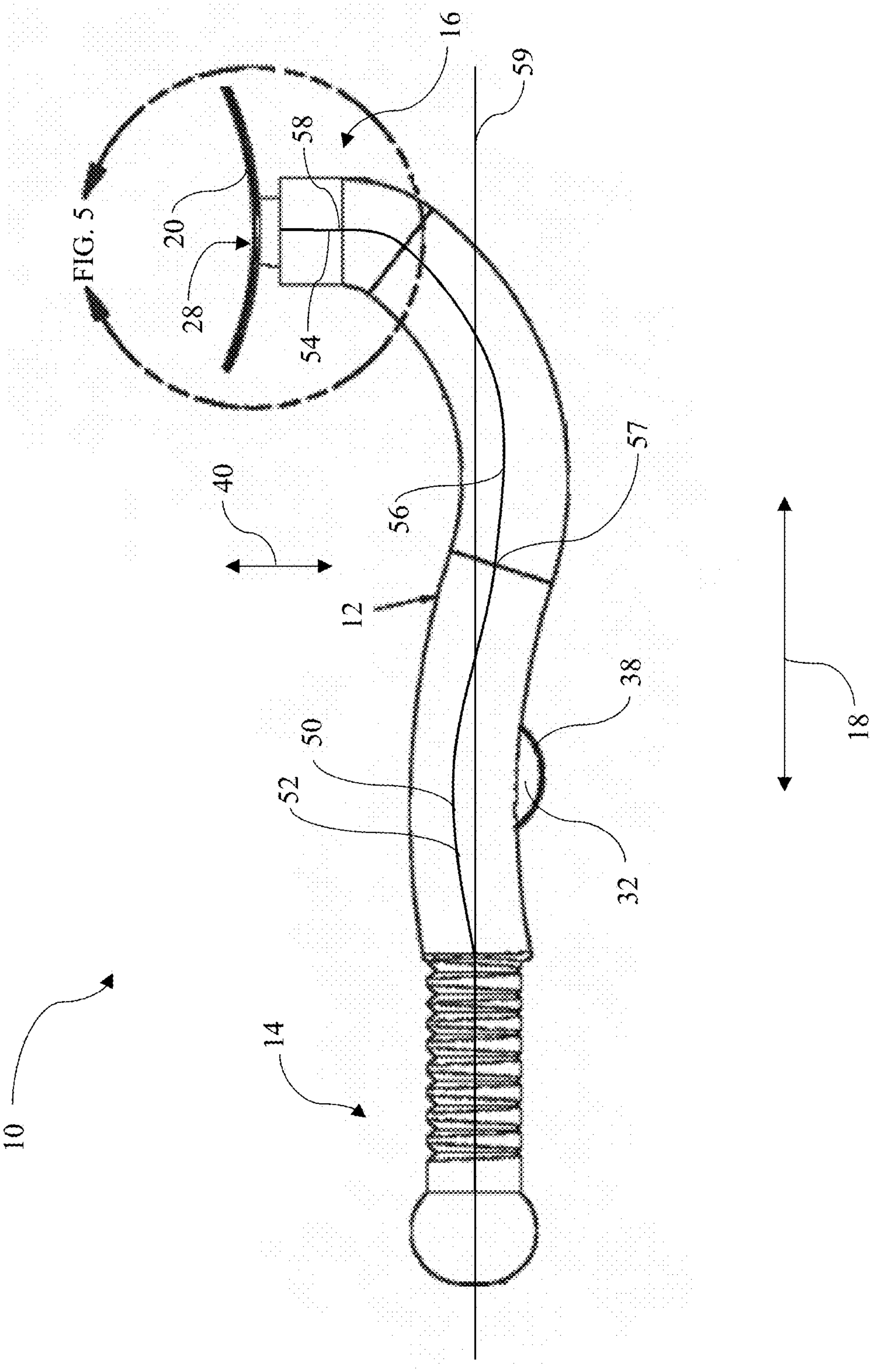
FIG. 2 is a side view of the apparatus of FIG. 1.
Figure 4:
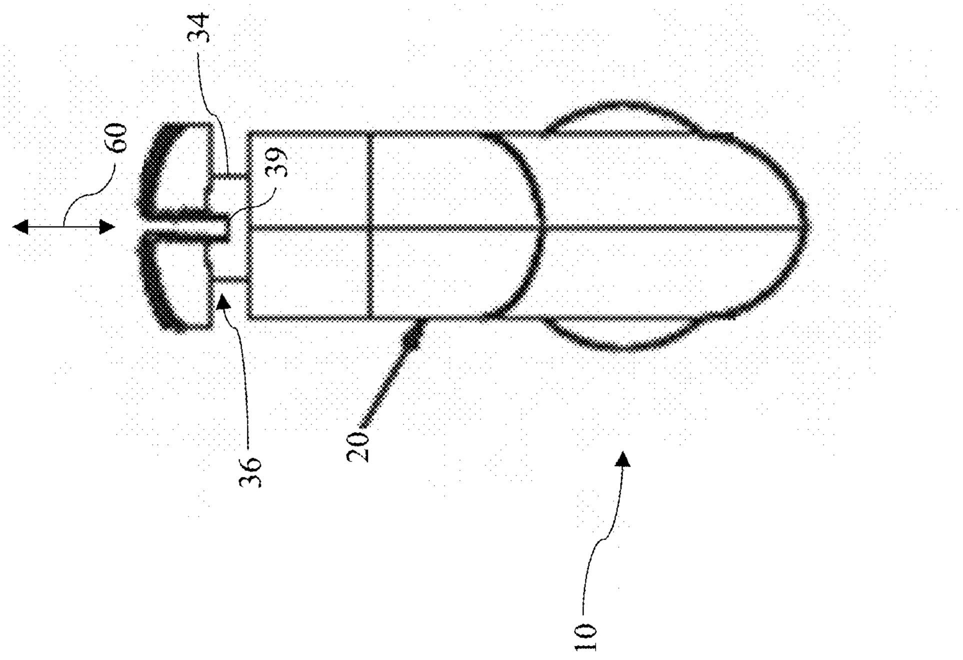
FIG. 4 is a front view of the apparatus of FIG. 1.
Figure 5:
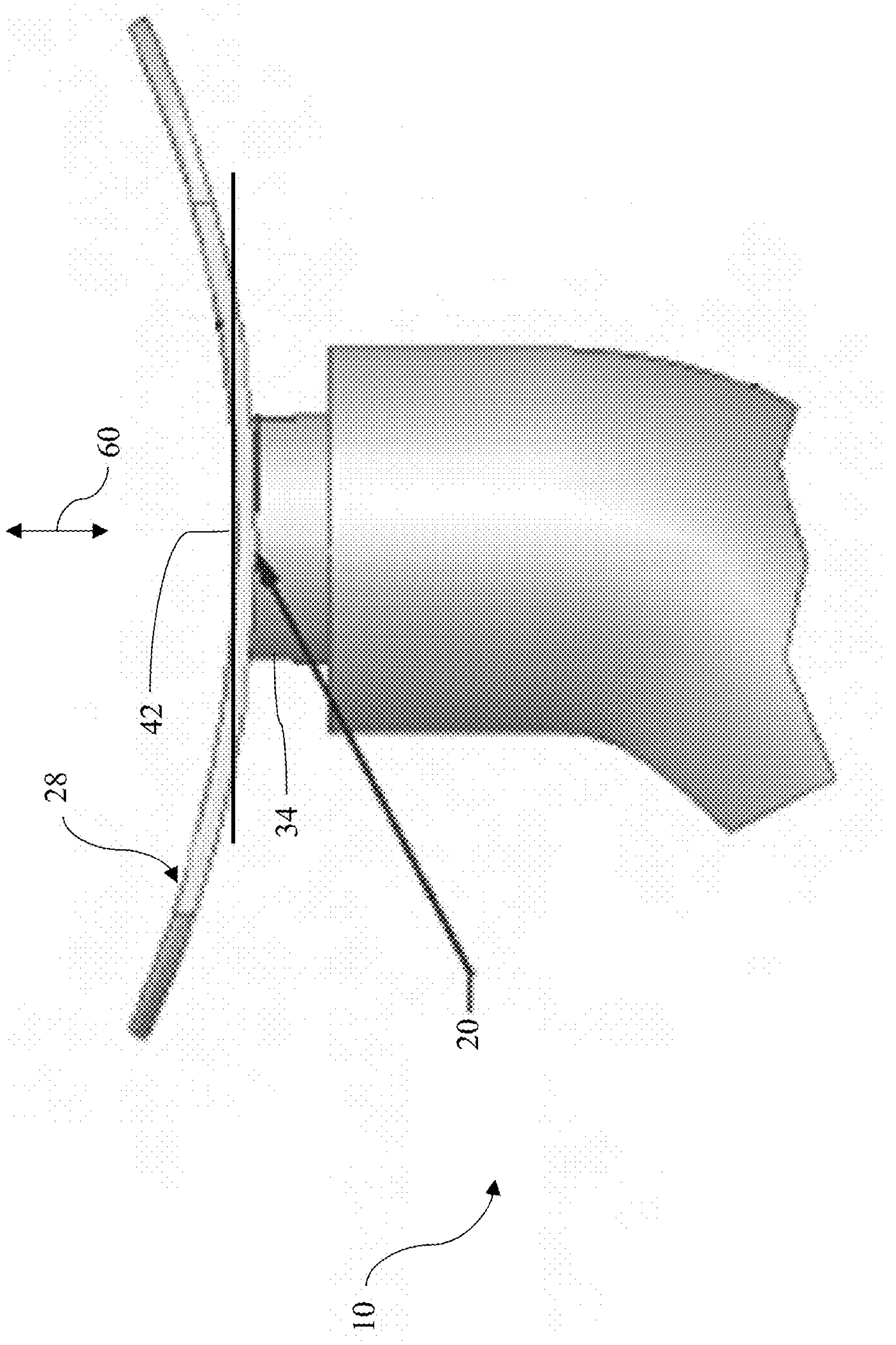
FIG. 5 is an enlarged view of a portion of the side view of the apparatus of FIG. 2.

Referring to FIGS. 2 and 4, in some aspects, the actuator 30 can comprise a slide 32 that is movable along the handle 12 (e.g., longitudinally along the handle, generally along the first axis 18) to move the opposing gripping elements 22 toward and away from each other along the clamping axis 26. For example, it is contemplated that the slide 32 can be integrally formed with or otherwise coupled to the gripping elements 22 so that retraction of the slide 32 toward the grip end 14 of the handle 12 causes retracting of the gripping elements toward the handle. In exemplary aspects, the slide 32 can be integrally formed (e.g., via injection molding) with the clamp 20 via a coupling body 34. The handle 12 can define an interior bore though which the coupling body 34 extends. The coupling body 34 can be a flexible body. The coupling body 34 can define a fork 36 between the gripping elements 22. The fork 36 can include two structures that meet at a union 39 that is spaced from the application surface 28 along a second axis 40 that is perpendicular to the first axis 18. The interior bore of the handle 12 can cooperate with the outer surface of the coupling body 34 so that retraction of the slide 32 draws the gripping elements 22 toward each other along the gripping axis 26. For example, the interior bore through the handle 12 can define a taper that biases against the fork 36, and/or the fork can have a widening outer surface in a direction away from the handle 12 so that, when the fork is retracted into the interior bore of the handle, the interior bore can bias opposing sides of the fork toward each other to move the gripping elements toward each other. Movement of the fork 36 away from the handle can allow the fork to resiliently spread, thereby moving the gripping elements 22 away from each other.

Figure 3:
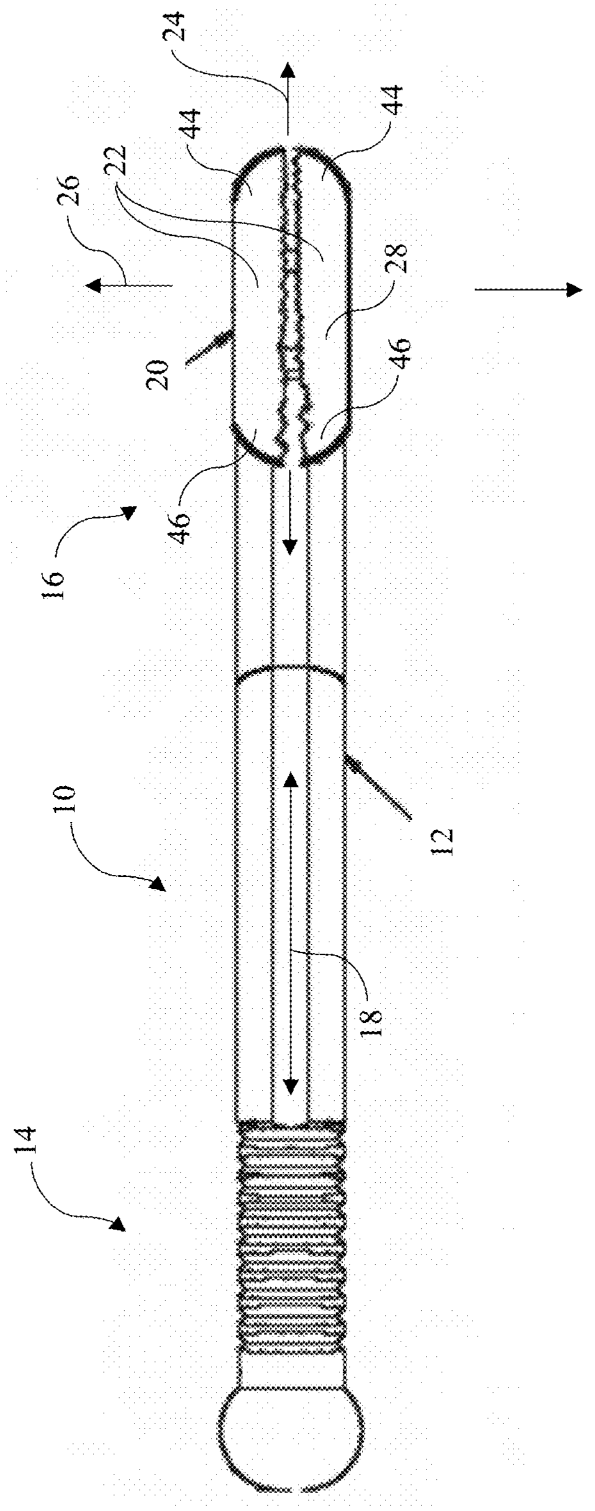
FIG. 3 is a top view of the apparatus of FIG. 1.

In various aspects, and as shown in FIG. 2, the slide 32 can comprise a projection 38 that is configured to extend outwardly from the handle 12. For example, the projection 38 can be positioned for actuation via a thumb or a finger of a user gripping the grip end 14 of the handle 12. In exemplary aspects, the projection 38 can extend from the handle 12 in a direction away from the clamp 20 along a second axis 40 that is perpendicular to the first axis 18. In other aspects, the projection 38 can extend from the handle 12 in a direction toward from the clamp 20 (or along the same side of the handle as the clamp) along the second axis 40. In other aspects, the projection 38 can extend from a side of the handle 12 (e.g., extending from the handle along the gripping axis 26 as shown in FIG. 3). For example, optionally, the slide 32 can comprise a pair of projections, each projection extending from a respective side of the handle.

The application surface 28 can be configured to bias the paper away from the handle (and toward a surface of an individual for wiping). In some aspects, the application surface 28 can be at least partly cylindrical. For example, at least a portion of the application surface 28 can define an outer surface of a portion of a cylinder. Optionally, an entirety of the application surface 28 can be cylindrical, i.e., having a consistent radius relative to a cylindrical axis. In some optional aspects, the application surface 28 can have a radius of between 4 and 16 inches, or between 5 and 10 inches, or about 7.25 inches. In other aspects, the application surface 28 can have a variable radius along the first axis 18.

In some optional aspects, a plane 42 that is tangential to the application surface 28 can be perpendicular to the second axis 40. The plane 42 can optionally be tangential to the application surface 28 at a location that is equally spaced, or substantially equally spaced, from opposing ends of the clamp 20 along the longitudinal axis 24.

Each gripping element of the opposed gripping elements can have first and second longitudinal ends 44, 46 that are spaced along the longitudinal axis 24 of clamp 20. The respective first ends 44 of each gripping element and the respective second ends of each gripping element can be configured to move toward and away from each other in response to the actuator causing the opposed gripping elements to move toward and away from each other. Thus, the first ends 44 of the gripping elements 22 can move away from each other and the second ends 46 of the gripping elements 22 can move away from each other as the actuator causes the gripping elements 22 to move away from each other. Similarly, the first ends 44 of the gripping elements 22 can move toward each other and the second ends 46 of the gripping elements 22 can move toward each other as the actuator causes the gripping elements to move toward each other. Thus, both of the first and second longitudinal ends 44, 46 of the gripping elements 22 can simultaneously move toward each other or away from each other. The gripping elements 22 can have rounded corners so that the clamp 20 has rounded opposed longitudinal ends.

The gripping elements 22 can have opposed surfaces that are configured to secure the paper therebetween. Optionally, said opposed surfaces of the gripping elements 22 can be smooth. In further aspects, they can be serrated or textured to improve grip therebetween. The opposed surfaces are shown in the Figures as broken surfaces to indicate that said opposed surfaces can be embodied in alternative ways.

The handle 12 can extend along a contour axis 50 that extends through a center of the handle (moving along the length of the handle). In some optional aspects, the contour axis 50 can have a first portion 52 that extends through the grip end 14 of the handle 12, a second portion 54 that extends through the clamp end 16 of the handle 12, and a third portion 56 that is positioned between the first portion 52 and the second portion 54. In some optional aspects, when moving along the second axis 40, at least a portion of the first portion 52 of the contour axis 50 can be between at least a portion of the third portion 56 and at least a portion of the second portion 54.

In exemplary aspects, the first and third portions 52, 56 can define (and meet at) a first junction 57 therebetween. The second and third portions 54, 56 can define (and meet at) a second junction 58 therebetween. It is contemplated that the handle 12 can have a change in curvature (e.g., a change in radius of curvature and/or direction of curvature) at one or both of the first and second junctions 57, 58. Thus, the curvature of the first portion 52 of the contour axis 50 can be different from one or both of the second portion 54 and third portion 56. For example, relative to the orientation as shown in FIG. 2, the first portion 52 can have a curvature with downward concavity, the second portion 54 can have no curvature, and the third portion 56 can have a curvature with upward concavity. Accordingly, the clamp end 16 of the handle 12 can be on a first side of a plane 59 that is parallel to the first and gripping axes 18, 26 and that intersects the contour axis 50 at the grip end 14, and at least a portion of the third portion 56 of the contour axis 50 can be on the other side of the plane 59. It is contemplated that the profile of the contour axis 50 can advantageously enable the handle to extend from the front of the individual and reach around (optionally, without contacting) parts of the anatomy (e.g., the buttocks) of the individual while allowing for optimal positioning of a wipe for usage as disclosed herein.

In some optional aspects, the handle 12 can have a length along the first axis 18 from about 15 to about 30 inches, or from about 18 to about 26 inches, or about 22 inches (e.g., about 22.6 inches). Optionally, the first portion 52 of the contour axis 50 can have a radius (along a portion or an entirety thereof) from about 10 inches to about 30 inches, from about 12 inches to about 24 inches, or about 18 inches (e.g., about 18.08 inches). Optionally, the second portion 54 and or the third portion 56 of the contour axis 50 can have a radius (along a portion or an entirety thereof) from about 5 inches to about 20 inches, from about 6 to about 10 inches, or about 7 inches (e.g., about 7.26 inches).

In some optional aspects, the clamp 20 can be configured to swivel relative to the handle 20 about a swivel axis 60. The swivel axis 60 can optionally be parallel to the second axis 40. The swivel axis 60 can optionally be tangential to the contour axis 50 at the clamp end 16 of the handle 12. Optionally, the clamp 20 can be biased toward a position in which the longitudinal axis 24 of the clamp 20 is parallel to the first axis 18.

In further aspects, the clamp 20 can be fixed relative to the handle 12 so that swiveling of the clamp relative to the handle 12 is inhibited. Accordingly, a user can manipulate the handle 12 about the swivel axis 60 to thereby swivel the clamp 20 about the swivel axis. It is contemplated that such a maneuver can promote advantageous cleaning capabilities during toileting applications. For example, swiveling of the handle 12 to swivel the clamp 20 can be a particularly effective cleaning motion, either for a user cleaning herself or another individual. It is contemplated that said swiveling movement of the clamp 20 by swiveling of the handle 12 can be particularly advantageous when combined with the shape of the clamp, the elongate profile of the clamp, having a concave application surface, or combinations thereof (as illustrated).

In some aspects, the grip end 14 of the handle 12 can have a textured surface to enhance gripping. In some optional aspects, the grip end 14 of the handle 12 can have a widened portion (e.g., a spherical portion) to enhance gripping by a user.

In some optional aspects, the application surface 28 can have a length along the longitudinal axis of the clamp 20 from about 4 to about 8 inches, or from about 5 inches to about 7 inches, or about 6 inches (e.g., about 6.08 inches).

It is contemplated that the disclosed embodiments can be particularly advantageous in certain circumstances. For example, the shape of the application surface of the clamp can more comfortably and effectively clean areas of the body during toileting applications than conventional toilet tissue aids. Similarly, the swivel movement of the clamp can facilitate more comfortable and effective cleaning of areas of the body during toileting applications than conventional toilet tissue aids. The movement of the gripping elements toward and away from each other can more effectively grip and more effectively release paper (or other wiping material) than conventional toilet tissue aids. Both the disclosed handle and the disclosed clamp can be more effective at reaching parts of the body of the individual holding the handle as well as for using the apparatus for caretaking of another individual. Still further, it is contemplated that the disclosed gripping elements can advantageously grip and hold a wad or bunched quantity of toilet paper. This can contrast to conventional toileting aids that can hold only a few small sheets.

Although several embodiments of the invention have been disclosed in the foregoing specification and the following appendices, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. An apparatus comprising:

a handle having a grip end and an opposed clamp end that are spaced along a first axis;

a clamp having a longitudinal axis and a first end and a second end that are spaced along the longitudinal axis, wherein the clamp is coupled to the handle and positioned at the clamp end of the handle, the clamp having opposed gripping elements that are elongate along the longitudinal axis, wherein the opposed gripping elements are configured to move toward and away from each other along a clamping axis to grip and release bathroom tissue, wherein the opposed gripping elements cooperate to define an application surface that is configured to face a portion of a body of a person and bias the bathroom tissue against the portion of the body of the person, wherein the application surface is an arcuate surface having a concavity facing away from the handle, wherein the arcuate surface extends from the first end to the second end of the clamp, wherein the arcuate surface is elongate along the longitudinal axis, wherein the clamp comprises a pair of opposed gripping surfaces that are configured to grip bathroom tissue therebetween, and wherein each gripping element of the opposed gripping elements comprises a respective gripping surface of the pair of gripping surfaces; and an actuator that is configured to move the opposed gripping elements toward and away from each other.

2. The apparatus of claim 1, wherein the arcuate surface of the application surface forms a portion of a surface of a cylinder, and wherein the cylinder has a central axis that is parallel to the clamping axis.

3. The apparatus of claim 1, wherein a plane that is tangential to at least a portion of the application surface is perpendicular to a second axis, wherein the second axis is perpendicular to the first axis and the clamping axis.

4. The apparatus of claim 1, wherein the actuator comprises a slide that is movable along the first axis to move the opposed gripping elements toward and away from each other along the clamping axis.

5. The apparatus of claim 1, wherein the actuator comprises a detent that is configured to retain the opposed gripping elements in a gripping position in which the opposed gripping elements are positioned sufficiently closely to one another to retain paper therebetween.

6. The apparatus of claim 1, wherein the handle has a contour axis passing through a center of the handle moving along a length of the handle, wherein the contour axis comprises a first portion that extends through the grip end of the handle, a second portion that extends through the clamp end of the handle, and a third portion that is positioned between the first portion and the second portion, wherein, relative to a plane that is parallel to each of the first axis and the clamping axis and that intersects the contour axis at the grip end, the clamp end of the handle is disposed on one side of said plane, and at least part of the third portion of the contour axis is disposed on an opposite side of said plane.

7. The apparatus of claim 1, wherein the clamp is configured to swivel relative to the handle about a swivel axis.

8. The apparatus of claim 7, wherein the clamp is biased toward a position in which the longitudinal axis of the clamp is parallel to the first axis.

9. The apparatus of claim 1, wherein the opposed gripping elements are coupled together by a flexible body.

10. The apparatus of claim 9, wherein the opposed gripping elements and flexible body are formed together as a monolithic unitary body, wherein the coupling body defines a fork having two fork portions that meet at a union, wherein the union is spaced from the application surface along a second axis that is perpendicular to the first axis.

11. The apparatus of claim 1, wherein each gripping element of the opposed gripping elements has first and second longitudinal ends that are spaced along the longitudinal axis of the clamp, wherein the respective first ends of each gripping element and the respective second ends of each gripping element are configured to move toward and away from each in response to the actuator causing the opposed gripping elements to move toward and away from each other.

12. The apparatus of claim 1, wherein the clamping axis is perpendicular to, or substantially perpendicular to, the longitudinal axis.

13. The apparatus of claim 1, wherein the clamp is configured not to swivel relative to the handle about a swivel axis.

14. The apparatus of claim 1, wherein the actuator comprises a slide that is movable along the handle, wherein the slide comprises a projection that extends from the handle in a direction away from the clamp along a second axis that is perpendicular to the first axis.

15. A method comprising:

positioning bathroom tissue between opposed gripping elements of a clamp of an apparatus comprising:

a handle having a grip end and an opposed clamp end that are spaced along a first axis;

the clamp, wherein the clamp has a longitudinal axis and a first end and a second end that are spaced along the longitudinal axis, wherein the clamp is coupled to the handle and positioned at the clamp end of the handle, wherein the opposed gripping elements are elongate along the longitudinal axis, wherein the opposed gripping elements are configured to move toward and away from each other along a clamping axis to grip and release the bathroom tissue, wherein the opposed gripping elements cooperate to define an application surface that is configured to face a portion of a body of a person and bias the bathroom tissue against the portion of the body of the person, wherein the application surface comprises is an arcuate surface having a concavity facing away from the handle, wherein the arcuate surface extends from the first end to the second end of the clamp, wherein the arcuate surface is elongate along the longitudinal axis, wherein the clamp comprises a pair of opposed gripping surfaces that are configured to grip bathroom tissue therebetween, and wherein each gripping element of the opposed gripping elements comprises a respective gripping surface of the pair of gripping surfaces; and an actuator that is configured to move the opposed gripping elements toward and away from each other; and actuating the actuator to move the opposed gripping elements toward one another to grip the bathroom tissue with the opposed gripping elements.

16. The method of claim 15, further comprising:

gripping the grip end of the handle; and applying the bathroom tissue to the portion of the body of the person.

17. The method of claim 16, wherein the person is different from a caretaker performing the method.

18. The method of claim 16, wherein the person is the person performing the method.

19. The method of claim 16, further comprising: actuating the actuator to move the opposed gripping elements away from one another to release the bathroom tissue.

* * * * *